United States Patent

Choi et al.

(10) Patent No.: US 12,221,458 B2
(45) Date of Patent: Feb. 11, 2025

(54) ORGANIC BORATE-BASED CATALYST, METHOD FOR PREPARING ISOBUTENE OLIGOMER USING THE SAME AND ISOBUTENE OLIGOMER PREPARED THEREBY

(71) Applicant: LG Chem, Ltd., Seoul (KR)

(72) Inventors: Gyeong Shin Choi, Daejeon (KR); Ji Hyun Choi, Daejeon (KR); Won Hee Kim, Daejeon (KR); Jin Lee, Daejeon (KR); Dong Hyun Jo, Daejeon (KR); Jeong Sik Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 700 days.

(21) Appl. No.: 17/601,544

(22) PCT Filed: Aug. 19, 2020

(86) PCT No.: PCT/KR2020/010872
§ 371 (c)(1),
(2) Date: Oct. 5, 2021

(87) PCT Pub. No.: WO2021/034041
PCT Pub. Date: Feb. 25, 2021

(65) Prior Publication Data
US 2022/0204533 A1    Jun. 30, 2022

(30) Foreign Application Priority Data

Aug. 19, 2019 (KR) .................. 10-2019-0101203
Aug. 19, 2019 (KR) .................. 10-2019-0101204

(51) Int. Cl.
*B01J 31/02* (2006.01)
*B01J 31/14* (2006.01)
*B01J 31/16* (2006.01)
*C07F 5/02* (2006.01)
*C07F 7/18* (2006.01)
*C08F 110/10* (2006.01)

(52) U.S. Cl.
CPC ............ *C07F 5/027* (2013.01); *C07F 7/1804* (2013.01); *C08F 110/10* (2013.01)

(58) Field of Classification Search
CPC ... B01J 31/146; B01J 31/0274; B01J 31/1608
See application file for complete search history.

(56) References Cited

U.S. PATENT DOCUMENTS

| | | | |
|---|---|---|---|
| 5,296,433 A * | 3/1994 | Siedle | C07F 7/0836 502/103 |
| 5,416,177 A | 5/1995 | Siedle et al. | |
| 5,625,087 A * | 4/1997 | Devore | C25B 3/23 502/158 |
| 5,705,503 A | 1/1998 | Goodall et al. | |
| 6,008,307 A | 12/1999 | Shaffer | |
| 6,165,235 A | 12/2000 | Kolp et al. | |
| 6,346,585 B1 | 2/2002 | Johnson et al. | |
| 2003/0088135 A1 | 5/2003 | Yun et al. | |
| 2003/0176606 A1 | 9/2003 | Bohnenpoll et al. | |
| 2004/0054102 A1 | 3/2004 | Ishigaki et al. | |
| 2004/0241251 A1 | 12/2004 | Thiele et al. | |
| 2005/0202981 A1 | 9/2005 | Eveland et al. | |
| 2007/0105709 A1 | 5/2007 | Carnahan et al. | |
| 2007/0203306 A1 | 8/2007 | Resendes et al. | |
| 2008/0221285 A1 | 9/2008 | Walter et al. | |
| 2008/0249264 A1 | 10/2008 | Hanefeld et al. | |
| 2008/0249267 A1 | 10/2008 | Hanefeld et al. | |
| 2012/0316303 A1 | 12/2012 | Hanton et al. | |
| 2015/0105525 A1 | 4/2015 | Faust et al. | |
| 2016/0083487 A1 | 3/2016 | Burdzy et al. | |
| 2017/0022306 A1 | 1/2017 | Nishida et al. | |
| 2018/0148523 A1 | 5/2018 | Jacobine et al. | |
| 2019/0062472 A1 | 2/2019 | Corberan Roc et al. | |
| 2020/0317832 A1 | 10/2020 | Corberan Roc et al. | |
| 2021/0253752 A1 | 8/2021 | Corberan Roc et al. | |

FOREIGN PATENT DOCUMENTS

| | | |
|---|---|---|
| CN | 101331159 A | 12/2008 |
| CN | 108602914 A | 9/2018 |
| EP | 0355895 A2 | 2/1990 |
| JP | H02101070 A | 4/1990 |
| JP | H10130316 A | 5/1998 |
| JP | H11505880 A | 5/1999 |
| JP | H11158479 A | 6/1999 |
| JP | 2003503563 A | 1/2003 |

(Continued)

OTHER PUBLICATIONS

Partial Supplementary European Search Report including Written Opinion for Application No. 20854908.9 dated Sep. 16, 2022, pp. 1-10.

(Continued)

*Primary Examiner* — Karuna P Reddy
(74) *Attorney, Agent, or Firm* — Lerner David LLP

(57) ABSTRACT

The present invention relates to an organic borate-based catalyst including a compound represented by the following Formula 1 and a hydroxyl group-containing compound, a method for preparing an isobutene oligomer using the same and an isobutene oligomer prepared thereby:

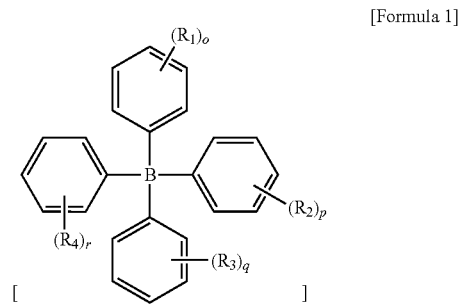

wherein $R_0$, $R_1$ to $R_4$, o, p, q and r are described therein.

11 Claims, 2 Drawing Sheets

(56) References Cited

FOREIGN PATENT DOCUMENTS

| | | | |
|---|---|---|---|
| JP | 2004532320 A | 10/2004 | |
| JP | 2007501292 A | 1/2007 | |
| JP | 2007217690 A | 8/2007 | |
| JP | 4541652 B2 | 9/2010 | |
| JP | 2018522127 A | 8/2018 | |
| JP | 2019505643 A | 2/2019 | |
| JP | 2019509374 A | 4/2019 | |
| KP | 20010052539 A | 6/2001 | |
| KR | 100266114 B1 | 9/2000 | |
| KR | 20000075063 A | 12/2000 | |
| KR | 100279498 B1 | 2/2001 | |
| KR | 100286778 B1 | 4/2001 | |
| KR | 20010082913 A | 8/2001 | |
| KR | 100486044 B1 | 4/2005 | |
| KR | 100805370 B1 | 2/2008 | |
| KR | 20080070057 A | 7/2008 | |
| KR | 20120098711 A | 9/2012 | |
| KR | 20150042739 A | 4/2015 | |
| KR | 20160006706 A | 1/2016 | |
| KR | 20180109938 A | 10/2018 | |
| KR | 20190040619 A | 4/2019 | |
| WO | 2015156408 A1 | 10/2015 | |
| WO | 2017140603 A1 | 8/2017 | |

OTHER PUBLICATIONS

Search Report dated Oct. 8, 2022 from the Office Action for Chinese Application No. 202080026130.6 issued Oct. 12, 2022, 2 pages.

Burrington, J.D. et al., "Cationic Polymerization Using Heteropolyacid Salt Catalysts", Topics in Catalysis, vol. 23, No. 1-4, Aug. 2003, pp. 175-181, XP019291956.

Extended European Search Report including Written Opinion for Application No. 20854908.9 dated Jan. 2, 2023, pp. 1-13.

Shiman, D. et al., "Cationic polymerization of isobutylene by AlCl3/ether complexes in non-polar solvents: Effect of ether structure on the selectivity of ß-H elimination", Polymer, vol. 54, Feb. 27, 2013, pp. 2235-2242, XP055117997.

ISR for Application No. PCT/KR2020/010872 dated Dec. 21, 2020, 5 pgs, in.

Kuhn et al., Solvent stabilized transition metal cations as initiators for cyclopentadiene polymerization, Macromolecular Rapid Communications, vol. 20, No. 10, pp. 555-559.

Corbin et al., Catalysis by cationic oxorhenium(V): hydrolysis and alcoholysis of organic silanes, Dalton transactions, 2009, vol. 38, No. 15, pp. 2850-2855.

\* cited by examiner

[FIG. 1]
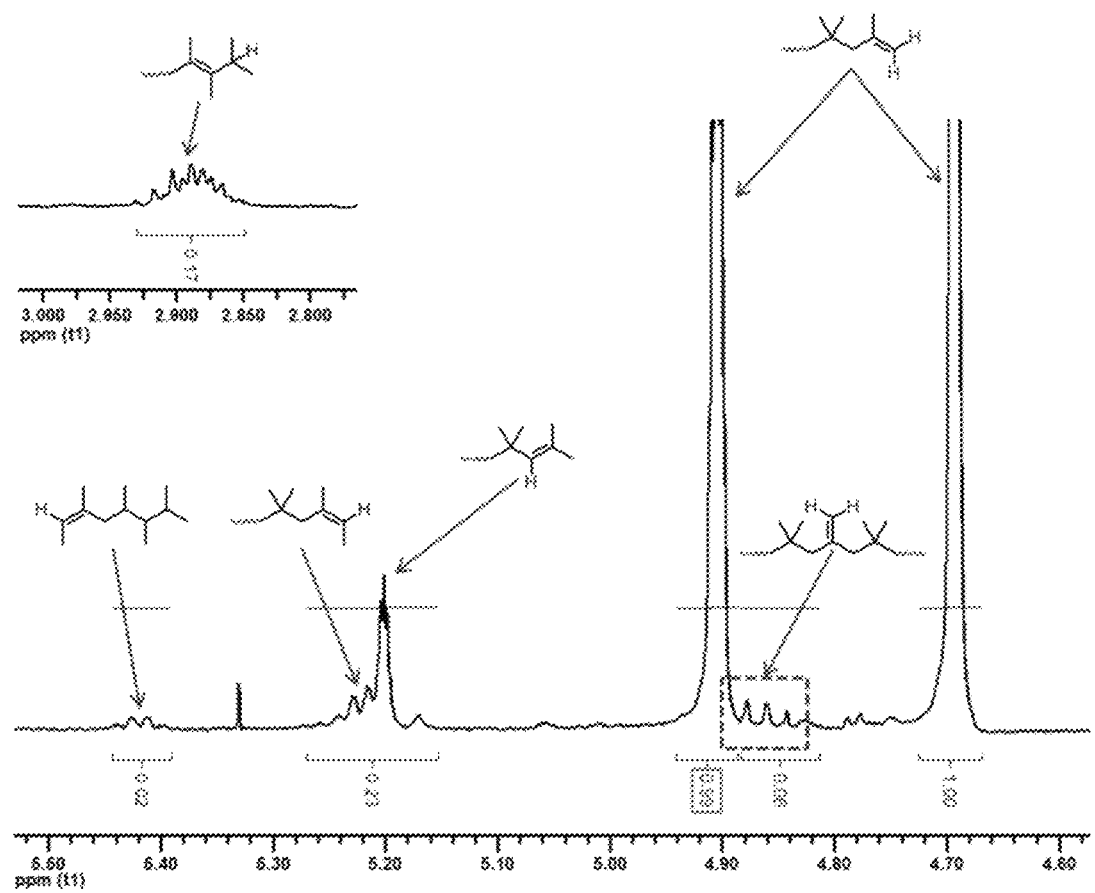

[FIG. 2]
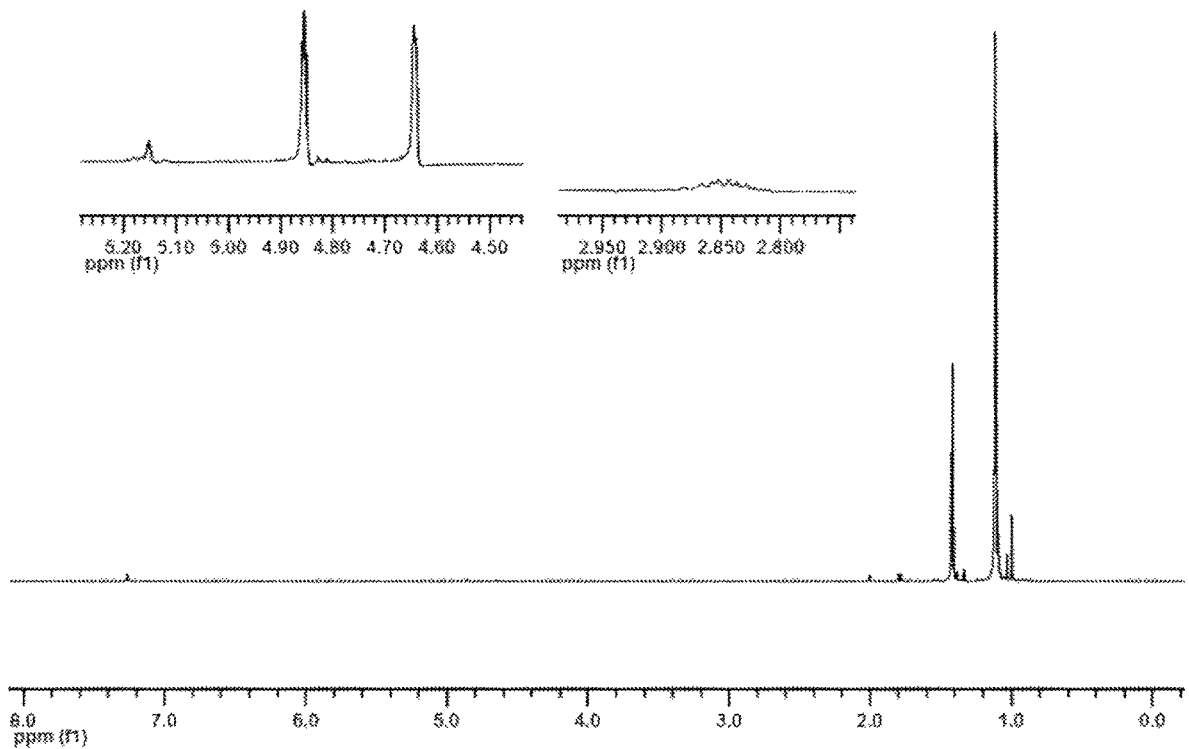

ORGANIC BORATE-BASED CATALYST, METHOD FOR PREPARING ISOBUTENE OLIGOMER USING THE SAME AND ISOBUTENE OLIGOMER PREPARED THEREBY

CROSS-REFERENCE TO RELATED APPLICATIONS

The present application is a national phase entry under 35 U.S.C. § 371 of International Application No. PCT/KR2020/010872 filed Aug. 19, 2020, which claims the priority from Korean Patent Application No. 10-2019-0101204, filed Aug. 19, 2019 and Korean Patent Application No. 10-2019-0101203, filed Aug. 19, 2019, all of which are incorporated herein by reference.

TECHNICAL FIELD

The present invention relates to an organic borate-based catalyst including a hydroxyl group-containing compound, a method for preparing an isobutene oligomer using the same and an isobutene oligomer prepared thereby.

BACKGROUND ART

Generally, in a process for preparing an oligomer or a polymer by the cationic polymerization of a monomer, a propagating polymer chain includes an active moiety which has a positive charge. For example, the active moiety may be a carbocation or an oxonium ion. Examples of a monomer which may carrying out such cationic polymerization include styrene, isobutene, cyclopentadiene, dicyclopentadiene and derivatives thereof, and polyisobutene obtained by polymerizing isobutene is the most typical example.

Polyisobutene is classified into a low molecular weight, medium molecular weight and high molecular weight range according to the range of molecular weight. The low molecular weight polyisobutene has a number average molecular weight in a range of about 10,000 or less, and includes product groups of common polybutene and high reactive polybutene (HR-PB). The high reactive polybutene includes a carbon-carbon double bond mainly positioned at the terminal of the polybutene, and after introducing a functional group using a vinylidene functional group at the terminal (>80%), the high reactive polybutene is used as a fuel additive or an engine oil additive. In addition, the medium molecular weight polyisobutene has a number average molecular weight in a range of about 30,000-100,000, and is mainly used in a sticking agent, an adhesive, a sealant and a wax, or may be used as a reforming agent of polyethylene or used in combination with natural rubber and synthetic rubber for improving antiaging properties and ozone resistance.

For the polymerization of the polyisobutene, a boron-based catalyst such as $BF_3$ has been used in the conventional technique, but this catalyst is toxic and has a gas type and is difficult to handle. In addition, in order to increase reactivity and selectivity, a boron-alcohol or boron-ether composite is prepared and used, but there are problems in that the activity of the catalyst is reduced over time.

Meanwhile, according to a solvent-ligated organometal catalyst studied by professor Kuhn of Technical University of Munich (Macromol. Rapid Commun., vol. 20, no. 10, pp. 555-559), problems relating to the deterioration of product quality and corrosiveness due to the toxic component such as a boron-based Lewis acid catalyst of the conventional technique may be solved, but since the reaction time is 16 hours and fundamentally long for attaining a high conversion ratio, structural isomerization is generated through the reaction of a portion of the product with the catalyst as time increases, and the exo-content decreases, and thus, the competitiveness is lower than the Lewis acid catalyst.

In case of using isobutene with high purity as a raw material for synthesizing the polyisobutene, a halogen-containing solvent such as methyl chloride ($CH_3Cl$) and dichloromethane ($CH_2Cl_2$) is used as a polymerization solvent. The polyisobutene thus produced is used in a fuel additive or a lubricant, but in this case, remaining halogen causes corrosion defects in an internal combustion engine, and in case of discharging the halogen, problems of environmental contamination are caused. In addition, in case of using the above-described conventional catalyst in a halogen-containing solvent, catalyst activity was lost, and the preparation of a high reactive polybutene was difficult. Particularly, the generation of the cationic polymerization reaction in moderate reaction conditions without setting extreme polymerization environment was almost impossible.

Against such background, the present inventors studied to develop a catalyst which may prepare a high reactive polybutene having better stability than the conventionally used catalyst in high efficiency.

PRIOR ART DOCUMENT

Patent Document (Patent Document 1) Korean Registration Patent Publication No. 10-0486044

DISCLOSURE OF THE INVENTION

Technical Problem

An object of the present invention is to provide a novel organic borate-based catalyst including a hydroxyl group-containing compound and a method for preparing the same.

Another object of the present invention is to provide a method for preparing an isobutene oligomer using the organic borate-based catalyst.

Another object of the present invention is to provide a novel isobutene oligomer prepared by the preparation method.

Technical Solution

In order to solve the above-described tasks, the present invention provides an organic borate-based catalyst including a compound represented by Formula 1 below and a hydroxyl group-containing compound, wherein a silicon atom (Si) of the compound represented by Formula 1 and an oxygen atom (O) of the hydroxyl group-containing compound form a covalent bond.

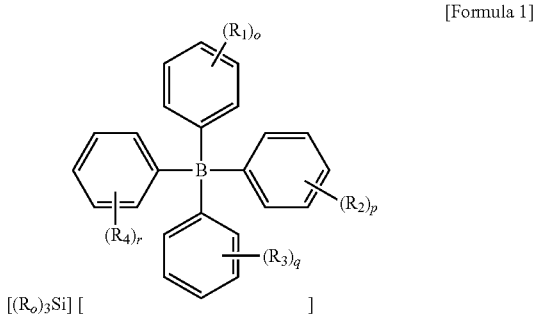

[Formula 1]

In Formula 1, each R0 is independently hydrogen, an alkyl group of 1 to 20 carbon atoms, an alkoxy group of 1 to 20 carbon atoms, an aryl group of 6 to 20 carbon atoms or an aryloxy group of 6 to 20 carbon atoms, $R_1$ to $R_4$ are each independently hydrogen, a halogen group or an alkyl group of 1 to 20 carbon atoms, and o, p, q and r are each independently an integer of 1 to 5.

In addition, the present invention provides a method for preparing an isobutene oligomer, including a step of polymerizing an isobutene monomer in the presence of the organic borate-based catalyst.

Further, the present invention provides an isobutene oligomer including functional groups represented by Formulae a to e below, not including a functional group represented by Formula f below, and having a number average molecular weight of 1,000 or more.

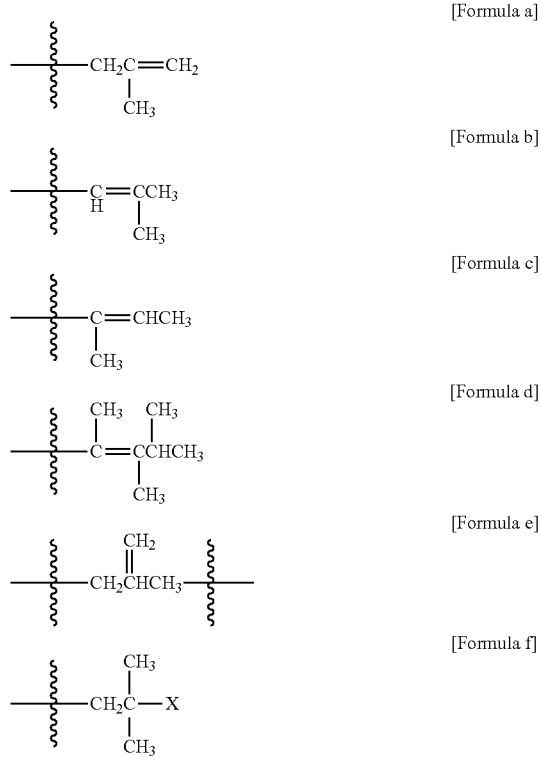

In Formula f,
X is a halogen atom.

In addition, the present invention provides a method for preparing an organic borate-based catalyst, including a step of injecting the compound represented by Formula 1 and the hydroxyl group-containing compound in a hydrocarbon solvent, and stirring.

Advantageous Effects

The novel organic borate-based catalyst of the present invention has higher stability than the conventionally used catalyst and may be usefully used for the preparation of an oligomer or a polymer, and has high catalyst activity and may relatively reduce the amount used, and thus, may be economical and eco-friendly. In addition, in case where the catalyst of the present invention is used in cationic polymerization reaction, there are no problems of remaining some structures derived from the catalyst in an initiation step in an oligomer or polymer, and the mixing of undesired some functional groups in the polymer may be prevented, and accordingly, there are advantages in efficiently preparing an oligomer and polymer with high purity.

In addition, in case of using the organic borate-based catalyst and not using a halogen-containing solvent, toxicity due to remaining halogen may be reduced, the corrosion of an internal combustion engine, environmental contamination, etc. may be prevented, and polymerization reaction may be performed even under moderate reaction conditions in an excellent conversion ratio.

The novel isobutene oligomer provided in the present invention includes terminal carbon-carbon double bonds in a high amount and has high reactivity and thus, is useful in commercial use. At the same time, since double bonds with diverse types positioned at the inner part of the oligomer are further included, the characteristics of improved processability of the isobutene oligomer may be achieved. Further, there are advantages in that different functional groups may be employed in the middle of or at the terminal of the polymer or oligomer by using the reactivity difference of each of the double bonds having diverse types, while keeping the common physical properties.

BRIEF DESCRIPTION OF DRAWINGS

FIG. 1 shows the $^1$H NMR spectrum of an isobutene oligomer according to an embodiment of the present invention.

FIG. 2 shows the $^1$H NMR spectrum of an isobutene oligomer according to a comparative embodiment in the present invention.

BEST MODE FOR CARRYING OUT THE INVENTION

Hereinafter, the present invention will be described in more detail in order to assist the understanding of the present invention. It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The terms used herein are for the purpose of describing particular embodiments only and are not intended to limit the present invention. The singular forms are intended to include the plural forms as well, unless the context clearly indicates otherwise.

Organic Borate-Based Catalyst

Conventionally, an aluminum- or boron-based Lewis acid has been generally used as a catalyst or initiator for cationic polymerization. Examples of the Lewis acid include $AlX_3$, $BX_3$ (X=F, Br, Cl, I), etc., and there are problems in that these are corrosive, generate halogen components such as HCl and HF during a quenching process, and remain in a product to deteriorate product quality. In addition, a Lewis acid catalyst requires a large amount of the catalyst, and after the reaction, a large amount of basic materials (NaOH, KOH, $NH_4OH$, etc.) are used for removing the catalyst, and additional washing with water is performed to generate a large amount of waste water.

The organic borate-based catalyst of the present invention is a novel catalyst developed for solving various problems of the conventional Lewis acid catalyst for cationic polymerization as described above, and is noncorrosive and has high catalyst activity different from the conventional Lewis acid catalyst. Accordingly, the amount used of the catalyst required for obtaining an equivalent level of effects is small, and catalyst cost is saved.

Also, in case of the conventional Lewis acid catalyst, there are problems of generating a large amount of highly toxic waste water during removing a catalyst through washing with a basic salt such as NaOH after finishing the reaction, but on the contrary, in the organic borate-based catalyst of the present invention, a catalyst may be removed by simple filtering, and the generation of waste water may be prevented. In addition, in case of the conventional Lewis acid catalyst, there are problems in that HF or HCl is produced during a quenching process, and halogen remains in a product to deteriorate product quality, but in the organic borate-based catalyst of the present invention, such problems may be solved and a product with clean and high quality may be produced.

Particularly, the catalyst of the present invention has a structure in which a silicon atom (Si) and an oxygen atom (O) form a covalent bond to form a composite, and the catalyst stability is markedly improved when compared with a case where an organic borate-based compound is solely present. Such a stabilized catalyst may be used for polymerizing a monomer and preparing an oligomer, and particularly, in case of forming an oligomer by the cationic polymerization of an isobutene monomer, there are characteristics in that the exo-content is high, and an oligomer having excellent reactivity may be efficiently prepared.

The organic borate-based catalyst of the present invention is characterized in including a compound represented by Formula 1 below and a hydroxyl group-containing compound, and a silicon atom (Si) of the compound represented by Formula 1 and an oxygen atom (O) of the hydroxyl group-containing compound form a covalent bond.

[Formula 1]

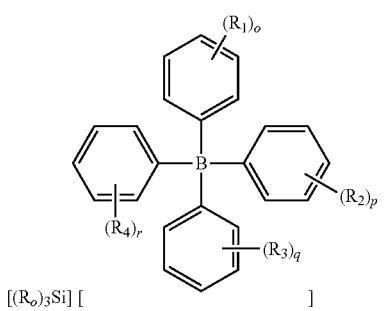

In Formula 1,
each $R_0$ is independently hydrogen, an alkyl group of 1 to 20 carbon atoms, an alkoxy group of 1 to 20 carbon atoms, an aryl group of 6 to 20 carbon atoms or an aryloxy group of 6 to 20 carbon atoms, preferably, hydrogen, an alkyl group of 1 to 12 carbon atoms, an alkoxy group of 1 to 12 carbon atoms, an aryl group of 6 to 12 carbon atoms or an aryloxy group of 6 to 12 carbon atoms, more preferably, hydrogen, an alkyl group of 1 to 6 carbon atoms or an alkoxy group of 1 to 6 carbon atoms, $R_1$ to $R_4$ are each independently hydrogen, a halogen group or an alkyl group of 1 to 20 carbon atoms, preferably, a halogen group-substituted alkyl group of 1 to 12 carbon atoms, more preferably, a halogen group-substituted alkyl group of 1 to 4 carbon atoms, and o, p, q and r are each independently an integer of 1 to 5.

The organic borate,

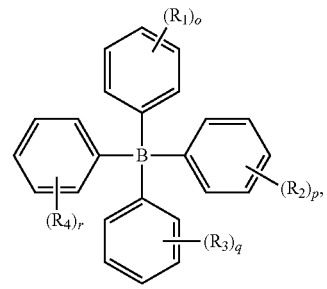

included in Formula 1 above, may particularly be one or more selected from the group consisting of tetrakis(phenyl)borate, tetrakis(pentafluorophenyl)borate, tetrakis[3,5-bis(trifluoromethyl)phenyl]borate and derivatives thereof, preferably, tetrakis(pentafluorophenyl)borate.

The "alkyl group" may mean a monovalent aliphatic saturated hydrocarbon, and may include both a linear alkyl group such as methyl, ethyl, propyl and butyl, and a branched alkyl group such as isopropyl, sec-butyl, tert-butyl and neo-pentyl. Particularly, a methyl group, an ethyl group, a propyl group, an isopropyl group, a butyl group, a tert-butyl group, a sec-butyl group, a 1-methyl-butyl group, a 1-ethyl-butyl group, a pentyl group, an isopentyl group, a neopentyl group, a tert-pentyl group, a 1-methylpentyl group, a 2-methylpentyl group, a 4-methyl-2-pentyl group, a hexyl group, an isohexyl group, a 4-methylhexyl group, a 5-methylhexyl group, an heptyl group, etc., may be included, without limitation.

The "alkoxy group" may be a linear type, a branch type or a ring type. Particularly, methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, etc., may be included, without limitation.

The "aryl group" may mean a cyclic aromatic hydrocarbon, and may include both monocyclic aromatic hydrocarbon in which one ring is formed, and polycyclic aromatic hydrocarbon in which two or more rings are formed. The monocyclic aromatic hydrocarbon may include a phenyl group, a biphenyl group, a terphenyl group, etc., and the polycyclic aromatic hydrocarbon may include a naphthyl group, an anthracenyl group, a phenanthryl group, a pyrenyl group, a perylenyl group, a triphenyl group, a chrysenyl group, a fluorenyl group, etc., without limitation.

The "aryloxy group" includes phenoxy, p-tolyloxy, m- to l yloxy, 3,5-dimethyl-phenoxy, 2,4,6-trimethylphenoxy, p-tert-butylphenoxy, 3-biphenyloxy, 4-biphenyloxy, 1-naphthyloxy, 2-naphthyloxy, 4-methyl-1-naphthyloxy, 5-methyl-2-naphthyloxy, 1-anthryloxy, 2-anthryloxy, 9-anthryloxy, 1-phenanthryloxy, 3-phenanthryloxy, 9-phenanthryloxy, etc., without limitation.

In the present invention, the hydroxyl group-containing compound may be water ($H_2O$) or a compound represented by Formula 2 below.

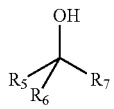

[Formula 2]

In Formula 2, $R_5$ to $R_7$ are each independently hydrogen, a hydroxyl group, a hydroxyalkyl group of 1 to 20 carbon atoms, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkoxy group of 1 to 20 carbon atoms, an aryloxy group of 6 to 20 carbon atoms, an alkylaryl group of 7 to 20 carbon atoms or an arylalkyl group of 7 to 20 carbon atoms.

Preferably, the hydroxyl group-containing compound is a compound represented by Formula 2, and in this case, $R_5$ to $R_7$ may be each independently hydrogen, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkylaryl group of 7 to 20 carbon atoms or an arylalkyl group of 7 to 20 carbon atoms.

For example, the compound represented by Formula 2 may correspond to any one among a primary alcohol, a secondary alcohol and a tertiary alcohol, and the primary alcohol includes methanol, ethanol, propanol, butanol, pentanol, hexanol, heptanol, octanol, nonanol, decanol or combinations thereof, the secondary alcohol includes propan-2-ol, butan-2-ol, pentan-2-ol, hexan-2-ol, heptan-2-ol, octan-2-ol, nonan-2-ol, decan-2-ol, butan-3-ol, pentan-3-ol, hexan-3-ol, heptan-3-ol, octan-3-ol, nonan-3-ol, decan-3-ol, or combinations thereof, and the tertiary alcohol includes 2-methylpropan-2-ol, 2-methylbutan-2-ol, 2-methylpentan-2-ol, 2-methylhexan-2-ol, 2-methylheptan-2-ol, 3-methylpentan-3-ol, 3-methylhexan-3-ol, 3-methylheptan-3-ol, 3-methyloctan-3-ol, 2-phenylpropan-2-ol, 2-phenylbutan-2-ol, 2-phenylpentan-2-ol, 2-phenylhexan-2-ol, 2-phenylheptan-2-ol, 3-phenylpentan-3-ol, 3-phenylhexan-3-ol, 3-phenylheptan-3-ol, 3-phenyloctan-3-ol, or combinations thereof, preferably, 2-methylpropan-2-ol, 2-phenylpropan-2-ol, or combinations thereof, without limitation. All compounds may be applicable only corresponding to the compound represented by Formula b in the present invention without limiting the types thereof.

In the present invention, the organic borate-based catalyst may be a compound represented by Formula 3 below.

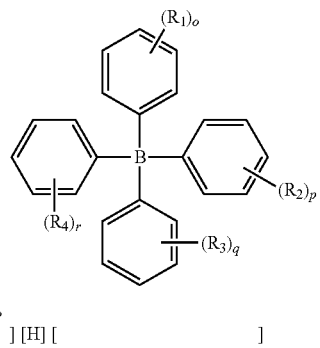

[Formula 3]

In Formula 3, each $R_0$ is independently hydrogen, an alkyl group of 1 to 20 carbon atoms, an alkoxy group of 1 to 20 carbon atoms, an aryl group of 6 to 20 carbon atoms or an aryloxy group of 6 to 20 carbon atoms, preferably, hydrogen, an alkyl group of 1 to 12 carbon atoms, an alkoxy group of 1 to 12 carbon atoms, an aryl group of 6 to 12 carbon atoms or an aryloxy group of 6 to 12 carbon atoms, more preferably, hydrogen, an alkyl group of 1 to 6 carbon atoms, or an alkoxy group of 1 to 6 carbon atoms, $R_1$ to $R_4$ are each independently hydrogen, a halogen group or an alkyl group of 1 to 20 carbon atoms, preferably, a halogen group-substituted alkyl group of 1 to 12 carbon atoms, more preferably, a halogen group-substituted alkyl group of 1 to 4 carbon atoms, o, p, q and r are each independently an integer of 1 to 5, and $R_5$ to $R_7$ are each independently hydrogen, a hydroxyl group, a hydroxyalkyl group of 1 to 20 carbon atoms, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkoxy group of 1 to 20 carbon atoms, an aryloxy group of 6 to 20 carbon atoms, an alkylaryl group of 7 to 20 carbon atoms or an arylalkyl group of 7 to 20 carbon atoms, preferably, hydrogen, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkylaryl group of 7 to 20 carbon atoms or an arylalkyl group of 7 to 20 carbon atoms.

As in Formula 3, the catalyst of the present invention has a structure in which a silicon atom included in the compound represented by Formula 1 and an oxygen atom included in the hydroxyl group-containing compound interact, and the oxygen-hydrogen bond of a hydroxyl group is activated. In conditions where a monomer is present, a hydrogen atom in the activated oxygen-hydrogen bond reacts with the monomer to produce carbocation to initiate polymerization.

For example, in case where the compound represented by Formula 1 is [$Et_3Si$][$B(C_6F_5)_4$], and the hydroxyl group-containing compound is 2-phenylpropan-2-ol in the present invention, the catalyst of the present invention is a compound having a structure below.

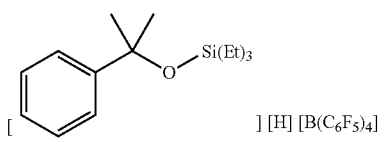

[ ] [H] [B(C₆F₅)₄]

In the present invention, the weight ratio of the compound represented by Formula 1 and the hydroxyl group-containing compound may be 1:0.5 to 1:4, preferably, 1:1 to 1:4, 1:0.1 to 1:2, more preferably, 1:1 to 1:2.

The catalyst of the present invention has a type forming a composite by the reaction of the compound represented by Formula 1 and the hydroxyl group-containing compound, and considering the reaction efficiency of the two compounds, the compound represented by Formula 1 and the hydroxyl group-containing compound may be used in the same weights, but a person skilled in the art may control the ratio suitably and use.

Method for Preparing Organic Borate-Based Catalyst

A method for preparing the organic borate-based catalyst is characterized in including a step of injecting a compound represented by Formula 1 below and a hydroxyl group-containing compound into a hydrocarbon solvent and stirring.

[Formula 1]

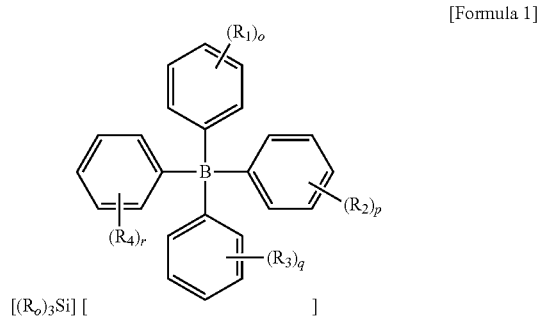

The definition on Formula 1 is the same as described above.

In the present invention, the time required for performing the stirring may be 0.5 hours or more, 1 hour or more, and 20 hours or less, 15 hours or less, without limitation.

Through the stirring, the compound represented by Formula 1 and the hydroxyl group-containing compound are sufficiently mixed in the hydrocarbon solvent, and the silicon atom of the compound represented by Formula 1 and the oxygen atom of the hydroxyl group-containing compound form a covalent bond from each other to prepare the organic borate-based catalyst of the present invention.

The conventional catalyst undergoes polymerization reaction while producing carbocations in a catalyst preparing process, and if the catalyst does not react with a monomer immediately after preparing the catalyst, the properties of returning back to a previous step through reverse reaction are significant due to the unstability of the carbocation, and the use of the catalyst after storing for a certain time after preparation is impossible.

In this case, the storage stability as a catalyst product itself is deteriorated, and since the carbocations with the unstable properties are required to show catalyst activity, the amount substantially playing the role of the catalyst is not large with respect to a raw material injected, and there are problems in that the economic feasibility and efficiency of a process using the catalyst is deteriorated.

On the contrary, the catalyst of the present invention becomes to have a composite type in which a silicon atom and an oxygen atom form a covalent bond through the stirring step, and this type may be used after a certain time from the preparation, because this type has excellent stability. If used after storing for a few minutes to a few hours from the preparation of the catalyst of the present invention, the above-described stirring may be continuously carried out during storing, or if a composite is formed through sufficient stirring, may be stood without stirring.

The organic borate-based catalyst according to the present invention may be used for preparing an oligomer or a polymer, including a step of polymerizing a monomer in the presence of the organic borate-based catalyst.

The "oligomer" means a polymer formed by polymerizing a monomer and having a number average molecular weight of less than 10,000.

The "polymer" means a polymer formed by polymerizing a monomer and having a number average molecular weight of 10,000 or more.

Particularly, the polymerization step may be initiated by a hydrogen cation derived from the hydroxyl group in the organic borate-based catalyst. For example, the initiation reaction of polymerizing a monomer by the hydrogen cation may be performed by the reaction below.

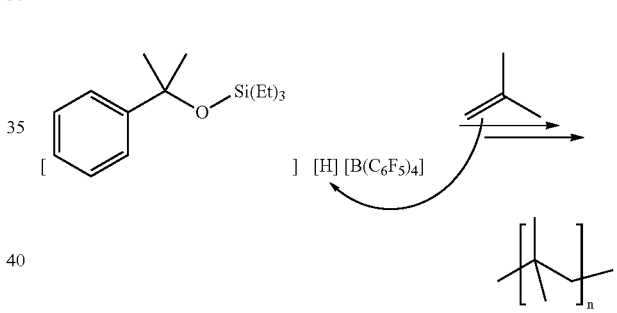

As shown in the reaction above, in case of using the organic borate-based catalyst of the present invention in polymerization reaction, the double bond of the monomer reacts with the hydrogen cation to initiate cationic polymerization.

In case of using the conventional catalyst, polymerization is initiated by the combination of not the hydrogen cation but a carbocation formed from a catalyst initiating polymerization or a separate reaction initiator with a monomer as described above, and a structure derived from the catalyst or reaction initiator remains in a finally prepared oligomer or polymer, resulting in the positioning of an unnecessary terminal structure. On the contrary, in case of using the catalyst of the present invention, a functional group derived from the catalyst or reaction initiator may not be contained in an oligomer or a polymer. Like this, by using the organic borate-based catalyst of the present invention in preparing an oligomer or a polymer, an oligomer or a polymer with a desired structure may be prepared in high purity.

The monomer may be isobutene, styrene, cyclopentadiene, dicyclopentadiene, tetrahydrofuran, derivatives thereof or combinations thereof, without limitation.

In the step of polymerizing the monomer, the monomer may be 1 wt % or more, 5 wt % or more, 50 wt % or less, 25 wt % or less based on the total weight of the reactant. In addition, the organic borate-based catalyst may be 0.005 wt % or more, 0.01 wt % or more, 1 wt % or less, 0.025 wt % or less based on the total weight of the reactant.

The organic borate-based catalyst may be 0.01 wt % or more, 1 wt % or less, 0.05 wt % or less based on the weight of the monomer, particularly, the compound represented by Formula 1 may be 0.005 wt % or more, 0.01 wt % or more, 0.05 wt % or less, 0.03 wt % or less based on the weight of the monomer, and the hydroxyl group-containing compound may be 0.005 wt % or more, 0.01 wt % or more, 0.05 wt % or less, 0.03 wt % or less based on the weight of the monomer, without limitation. The polymerization may be performed form 30 minutes to 120 minutes.

As the oligomer prepared using the organic borate-based catalyst of the present invention, high reactive polybutene (HR-PB) may have the exo-content of 50 to 99%, preferably, 80 to 99%. The exo-content represents a case where carbon-carbon double bonds are positioned at the terminal of a polyolefin, and if the exo-content increases, the reactivity increases.

Also, an oligomer prepared using the organic borate-based catalyst of the present invention may have a number average molecular weight of less than 10,000, 3,000 or less, 2,000 or less, 800 or more, 900 or more, and a polymer having a medium molecular weight or more and prepared using the organic borate-based catalyst of the present invention may have a number average molecular weight of 10,000 or more, 40,000 or more, 100,000 or less, 80,000 or less.

In addition, the molecular weight distribution of the oligomer or the polymer may be 1.5 to 5.0.

The preparation method of the oligomer or polymer may further include a step of removing the organic borate-based catalyst after the step of polymerizing a monomer.

The organic borate-based catalyst of the present invention may be efficiently removed through a physical simple filtering process, and the use and removal thereof is even easier than the conventional Lewis catalyst acid.

Particularly, after polymerizing the monomer, the organic solvent is removed so that the organic solvent may be controlled to 40 wt % or less, 20 wt % or less or 5 wt % or less of the oligomer or polymer.

Then, in case of an oligomer or a polymer having flowability, a step of filtering insoluble materials using a glass filter of 80 mesh or more, 100 mesh or more or 200 mesh or more is performed. Otherwise, the catalyst may be removed by passing the oligomer or polymer having flowability through a silica, celite or zeolite filter.

Meanwhile, in case of an oligomer or polymer having small flowability, flowability is given using one or more selected from the group consisting of a linear alkyl solvent, for example, pentane, cyclopentane, hexane, cyclohexane, heptane, and octane, and an ether solvent, for example, diethyl ether, and petroleum ether, and then the step of filtering through the glass filter, silica, celite or zeolite filter may be performed.

Generally, the oligomer or polymer thus produced is dissolved in an organic solvent including pentane, cyclopentane, hexane, cyclohexane, heptane, octane, diethyl ether or petroleum ether and washed to remove an organometallic catalyst. However, in the present invention, the organic borate-based catalyst may be efficiently removed through the above-described simple filtering step, and a separate washing step may not be performed.

Method for Preparing Isobutene Oligomer

The method for preparing an isobutene oligomer of the present invention is characterized in including a step of polymerizing an isobutene monomer in the presence of the above-described organic borate-based catalyst.

The polymerization may be performed in the presence of a halogen-free solvent, and a halogenated hydrocarbon solvent may not be included at all. That is, the halogen-free solvent and the halogenated hydrocarbon solvent may be mixed and used, or only the halogen-free solvent may be used solely as a solvent.

The halogen-free solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane and octane, and the aromatic hydrocarbon solvent may be one or more selected from the group consisting of benzene, toluene, xylene and ethylbenzene, without limitation.

The halogenated hydrocarbon solvent may be one or more selected from the group consisting of chloromethane, dichloromethane, trichloromethane, 1-chlorobutane and chlorobenzene, without limitation.

In case of mixing the halogen-free solvent and the halogenated hydrocarbon solvent and using thereof in the present invention, a volume ratio may be 100:1 to 1:2, particularly, 100:1 to 1:1, without limitation.

In the present invention, the silicon atom of the compound represented by Formula 1 and the oxygen atom of the hydroxyl group-containing compound form a covalent bond first to produce a composite forming a stable catalyst system as described above, and then, the composite is mixed with an isobutene monomer to initiate polymerization reaction. If the compound represented by Formula 1 and the hydroxyl group-containing compound do not form a composite but are mixed at once with the isobutene monomer as individual materials, polymerization reaction may not be properly performed.

For example, the preparation method may be performed by dissolving the organic borate-based catalyst of the present invention in a halogen-free solvent to prepare a solution, dissolving an isobutene monomer in other halogen-free solvent to prepare another solution, and mixing two solutions.

The polymerization of the isobutene monomer may be performed at 10 to 30° C., particularly, 15 to 30° C., more particularly, 20 to 30° C.

In the preparation method of the present invention, since the composite formed by the compound represented by Formula 1 and the hydroxyl group-containing compound is used as a catalyst, though polymerization is performed in a halogen-free solvent, the polymerization may be preferably performed not at an extremely low temperature of −30° C. or less but under moderate reaction conditions of about 10 to 30° C. Accordingly, there are advantages in saving reaction equipment, cost, etc., which are required for setting the extremely low temperature.

In the present invention, the polymerization may have a conversion ratio (%) value calculated by Mathematical Formula 1 below of 80% or more.

$$\text{Conversion ratio}(\%) = \text{isobutene oligomer(weight)} / \text{isobutene monomer(weight)} \times 100 \quad \text{[Mathematical Formula 1]}$$

The terminal carbon-carbon double bond content of the isobutene oligomer prepared by the preparation method of the present invention may be 85 mol % or more, particularly, 90 mol % or more, or 94 mol % or more. The carbon-carbon double bond positioned at the terminal of the isobutene oligomer may be referred to as an exo-olefin, and since the terminal carbon-carbon double bond undergoes reaction more favorably toward the inner part of the chain of the oligomer, the terminal carbon-carbon double bond (exo-content) acts as an important factor for determining the quality of the isobutene oligomer, and the increased content represents an isobutene oligomer having excellent reactivity.

The number average molecular weight of the isobutene oligomer prepared by the preparation method of the present invention may be 5,500 or less, or 4,000 or less, or 2,000 or less, and 500 or more, or 750 or more, or 900 or more.

The molecular weight distribution of the isobutene oligomer prepared by the preparation method of the present invention may be 5.0 or less, particularly, 1.5 to 5.0.

The polymerization of the isobutene monomer may be performed by a batch type or a continuous type process, and as a polymerization method, a solution polymerization method, a suspension polymerization method, a vapor polymerization method by which a small amount of s polymer is impregnated with a catalyst solution with a high concentration, etc. may be used. A reactor used for the polymerization may use a known reactor used for polymerizing an isobutene monomer as it is, or after processing.

In the polymerization of the isobutene monomer, the amount of the isobutene monomer may be 1 to 50 wt %, preferably, 5 to 25 wt % based on the total weight of the polymerization solution. In addition, the amount of the compound represented by Formula 1 may be 0.005 to 1 wt %, preferably, 0.01 to 0.025 wt % based on the total weight of the polymerization solution. If the numerical range is satisfied, polymerization may be efficiently performed, but if an excessive amount is injected than the numerical range, polymerization efficiency may not be significantly improved in contrast to the increased cost of raw materials.

In the preparation method of the isobutene oligomer of the present invention, a step of removing the catalyst by washing a polymerization product may not be separately performed after the polymerization. Instead, the polymerization product may be filtered to easily remove the catalyst.

The filtering may be performed using a porous material, for example, a filter including one or more selected from the group consisting of celite, silica and zeolite, and alumina. In this case, the catalyst is considered to be filtered through the absorption principle of the porous material, etc. Accordingly, if a glass fiber or a filter having a minute pore size is used, catalyst filtering efficiency may be deteriorated.

The preparation method of the isobutene oligomer of the present invention may further include a step of drying remaining solvent after the filtering step. For example, the drying temperature may be 30 to 200° C., or 40 to 150° C., and the vacuum degree may be 300 torr or less, 200 torr or less, or 100 torr or less. At last, a desired isobutene oligomer may be efficiently obtained. In addition, a drying method is not specifically limited, and a common method may be applied.

Further, in the preparation method of the isobutene oligomer of the present invention, a step of drying the solvent may be separately performed after polymerization and before the filtering. In case of performing the drying step, drying conditions may be the same as described above, without specific limitation.

In case of separately performing the drying of the solvent, there are advantages of obtaining an isobutene oligomer in high purity. However, according to the present invention, the catalyst may be easily removed through the aforementioned simple filtering, and the drying step of the solvent after polymerization and before the filtering may be omitted, and the process may be simplified.

Isobutene Oligomer

The isobutene oligomer of the present invention is characterized in including functional groups represented by Formulae a to e below, not including a functional group represented by Formula f below, and having a number average molecular weight of 1,000 or more. The isobutene oligomer may be prepared by a preparation method including a step of performing cationic polymerization of an isobutene monomer in the presence of the above-described organic borate-based catalyst.

[Formula a]
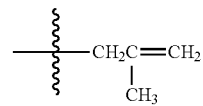

[Formula b]
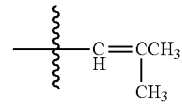

[Formula c]
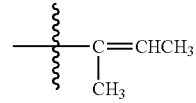

[Formula d]
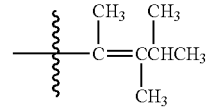

[Formula e]
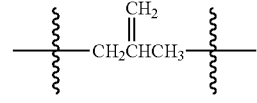

[Formula f]
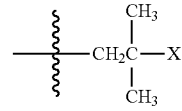

In Formula f,

X is a halogen atom.

The functional group represented by Formula a (hereinafter, "exo-functional group" will be used interchangeably) represents a case where a carbon-carbon double bond is positioned at the terminal of an isobutene oligomer, i.e., a vinylidene double bond. The double bond positioned at the terminal of the isobutene oligomer reacts toward the inner part of other polymer chain more favorably, and the exo-functional group content may be utilized as an index for evaluating the reactivity of the isobutene oligomer, wherein the high content means that the isobutene oligomer has excellent reactivity.

The functional group represented by Formula a may be a functional group represented by Formulae a-1 below.

[Formula a-1]
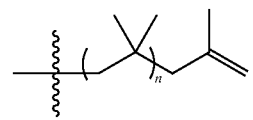

In Formula a-1, n is an integer of 1 to 200.

In addition, the amount of the functional group represented by Formula a may be 70 to 95 mol %, more particularly, 70 to 90 mol %, 80 to 95 mol %, 80 to 93 mol % based on the total amount of the functional groups represented by Formulae a to e.

Since the isobutene oligomer of the present invention includes the functional group represented by Formula a in the high content as described above, the reactivity is excellent, the commercial use thereof is suitable. In addition, as described herein below, since the content of the functional group represented by Formula a is high, and at the same time, various types of double bonds positioned in the oligomer are included, processability is also improved, and thus, both high reactivity and processability may be achieved.

The functional group represented by Formula b (hereinafter, "endo-functional group" will be used interchangeably) is a case where a double bond is present in a carbon-carbon bond just adjacent to the terminal of an oligomer, and as illustrated in Reaction 1 below, may be produced by the generation of proton transfer reaction in a mechanism forming the functional group represented by Formula a.

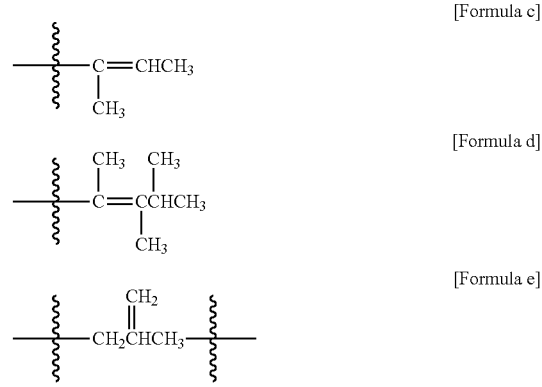

The functional groups represented by Formulae c to e above are functional groups which are types formed in case where isomerization reaction is carried out during the cationic polymerization of isobutene, and if the isomerization reaction is carried out during synthesizing an isobutene oligomer, all are inevitable functional groups.

[Reaction 1]

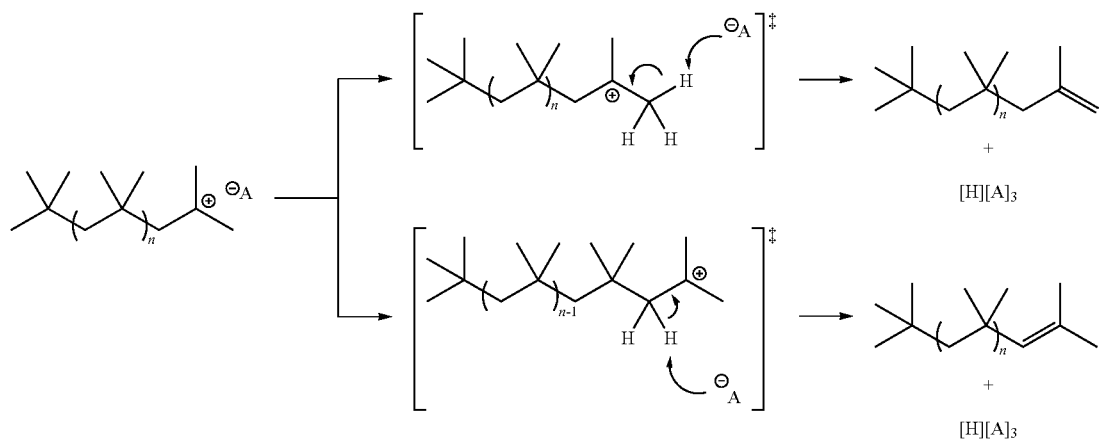

The functional group represented by Formula b may be a functional group represented by Formulae b-1 below.

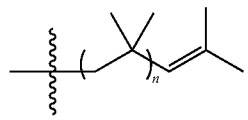

[Formula b-1]

In Formula b-1, n is an integer of 1 to 200.

In addition, the isobutene oligomer of the present invention includes all functional groups represented by Formulae c to e below.

However, in order to improve the reactivity, the conventionally used oligomer intended to increase the content of the functional group represented by Formula a, i.e., the exo-functional group content, and for this, the temperature of polymerization reaction during cationic polymerization was set to less than 10° C., preferably, less than 0° C., or less than −10° C., and the polymerization reaction was performed. An oligomer prepared in such extremely low temperature environment mainly underwent the reaction of the path represented by Reaction 1 above, and only the functional groups represented by Formulae a and b were confirmed, and the functional groups represented by Formulae c to e were not formed.

Differently, the oligomer of the present invention is an oligomer produced in moderate temperature conditions of 20° C. or more by using the above-described organic borate-based catalyst, and in such temperature conditions, diverse isomerization reactions are shown during the polymerization process, and accordingly, a novel structure including all functional groups represented by Formulae c to e may be obtained.

That is, the oligomer of the present invention is prepared by using an organic borate-based catalyst and is an oligomer including the functional groups included in the conventional isobutene oligomer in addition to all functional groups represented by Formulae c to e, which are isomers thereof. At the same time, the oligomer also includes the terminal double bond in the high content and has high reactivity.

The functional group represented by Formula c may be a functional group represented by Formulae c-1 below.

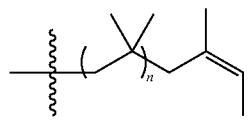

[Formula c-1]

In Formula c-1,
n is an integer of 1 to 200.

The functional group represented by Formula c may be prepared via hydride shift and methyl shift as shown below in cationic polymerization reaction.

[Reaction 2]

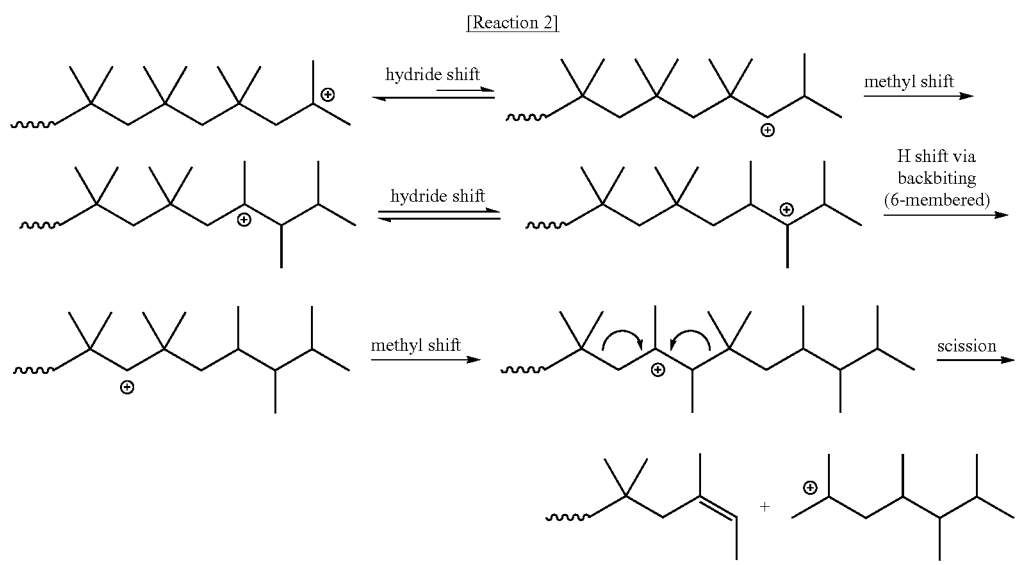

[Reaction 3]

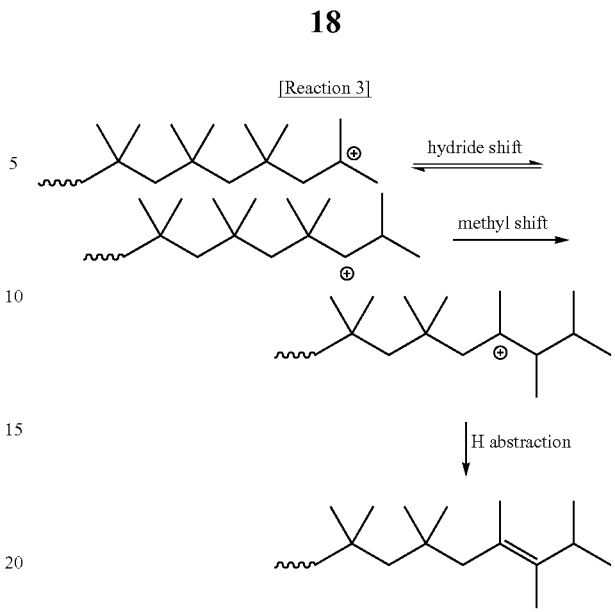

If represented by mol %, the total amount of the functional groups represented by Formulae b and c may be 3 to 12 mol %, or 4 to 10 mol % based on the total amount of the functional groups represented by Formulae a to e.

The functional group represented by Formula d may be a functional group represented by Formulae d-1 below.

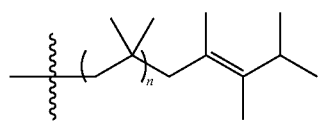

[Formula d-1]

In Formula d-1,
n is an integer of 1 to 200.

The functional group represented by Formula d may be prepared via hydride shift and methyl shift as shown below in cationic polymerization reaction.

If represented by mol %, the amount of the functional group represented by Formula d may be 3 to 10 mol %, 3 to 8 mol %, or 4 to 6 mol % based on the total amount of the functional groups represented by Formulae a to e.

The functional group represented by Formula e may be a functional group represented by Formulae e-1 below.

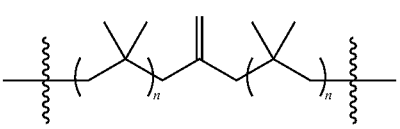

[Formula e-1]

In Formula e-1,
n is an integer of 1 to 200.

Since the isobutene oligomer of the present invention includes a functional group having high reactivity like the functional group represented by Formula e, there are advantages in that the introduction of a functional group into the oligomer is easy.

The functional group represented by Formula e may be prepared through the reaction below in cationic polymerization reaction.

[Reaction 4]

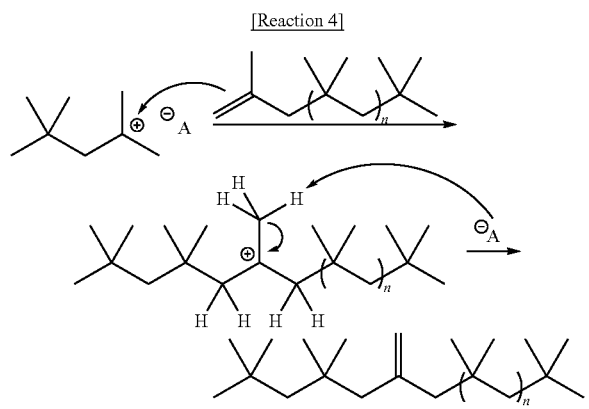

If represented by mol %, the amount of the functional group represented by Formula e may be 0.1 to 10 mol %, 0.5 to 10 mol %, 0.5 to 8 mol %, or 0.5 to 6 mol % based on the total amount of the functional groups represented by Formulae a to e.

The isobutene oligomer of the present invention does not include the functional group represented by Formula f below.

[Formula f]

In Formula f,
X is a halogen atom.

In case of using a metal halide catalyst ($MX_3$, M: Al, Fe, Ga, Ti, X: F, Cl, Br, I), $MX_4^-$ counterion is present during the reaction, and the functional group represented by Formula f is a functional group produced by the reaction of a carbocation with a halogen atom ion during a termination process after forming all oligomer chains. This functional group inhibits the purpose for introducing functional groups by containing as much terminal double bonds in the isobutene oligomer, materials such as HCl and HF are produced by water during a washing process, and problems of introducing the materials to the terminal double bond of the isobutene oligomer by hydrohalogenation reaction may arise. In addition, in case of introducing the functional group into the isobutene oligomer and using as an engine oil, fuel additive, etc., harmful materials including halogen are discharged during combustion, and problems of generating environmental contamination may be shown.

The isobutene oligomer of the present invention is prepared using the above-described organic borate-based catalyst and does not include the functional group represented by Formula f in the oligomer. Accordingly, excellent properties of not showing the problems induced by the functional group represented by Formula f in the oligomer may be achieved.

In addition, the isobutene oligomer of the present invention may include the functional groups represented by Formulae a to e based on the total amount of the functional groups represented by Formulae a to e: 70 to 90 mol % of the functional group represented by Formula a; 5 to 10 mol % of the sum of the functional groups represented by Formulae b and c; 3 to 10 mol % of the functional group represented by Formula d; and 0.1 to 10 mol % of the functional group represented by Formula e.

As described above, the isobutene oligomer of the present invention includes the functional group of Formula a which is the terminal carbon-carbon double bond in the high content, and also includes the functional groups of Formulae b to e, which are double bonds formed through various isomerization during cationic polymerization process. Like this, though including various double bonds through the isomerization, the terminal carbon-carbon double bond content of the oligomer, that is, the content of the functional group represented by Formula a is still high, and various functional groups are included without losing the high reactivity due to the terminal double bond, and thus, there are advantages of improving processability.

The number average molecular weight of the isobutene oligomer of the present invention may be 1,000 or more, 1,100 or more, and molecular weight distribution may be 1.5 to 3.5.

As described above, the isobutene oligomer of the present invention does not include the functional group represented by Formula f. If the functional group represented by Formula f is present, this is activated by a metal halide catalyst to generate counterions again and continue polymer chain propagation. Accordingly, in order for the isobutene oligomer prepared by the metal halide catalyst to have a number average molecular weight of the above-described level, the functional group represented by Formula f is required to be included.

On the contrary, the metal halide catalyst is not used, but a bulky organic borate is included as an anion part to stabilize carbocation in the present invention, and there are advantages in that the molecular weight of an oligomer may be increased at one time during cationic polymerization.

EXAMPLES

Hereinafter, preferred embodiments will be described in detail so as to assist the understanding of the present invention. However, the embodiments below are only illustrations, and the invention may be changed and modified in many different forms and should not be construed as being limited to the embodiments set forth herein, and such change and modification should be included in attached claims.

Preparation of Catalyst

Preparation Example 1

0.01 wt % of [Et3Si][B(C6F$_5$)$_4$] and 0.02 wt % of 2-phenylpropan-2-ol with respect to the weight of a monomer were dissolved in toluene, respectively, and stirred for 1 hour.

Preparation Examples 2 to 4, and Comparative Preparation Examples 1 and 2

Catalysts were prepared by the same method as in Preparation Example 1 except for changing the type and amount of materials used as in Table 1 below.

TABLE 1

| Division | Compound represented by Formula 1 | Wt % with respect to isobutene monomer | Hydroxyl group-containing compound | Wt % with respect to isobutene monomer |
|---|---|---|---|---|
| Preparation Example 1 | [Et$_3$Si][B(C$_6$F$_5$)$_4$] | 0.01 wt % | 2-phenylpropan-2-ol | 0.02 wt % |
| Preparation Example 2 | [Et$_3$Si][B(C$_6$F$_5$)$_4$] | 0.02 wt % | 2-phenylpropan-2-ol | 0.01 wt % |
| Preparation Example 3 | [Et$_3$Si][B(C$_6$F$_5$)$_4$] | 0.01 wt % | 2-methylpropan-2-ol | 0.01 wt % |
| Preparation Example 4 | [Et$_3$Si][B(C$_6$F$_5$)$_4$] | 0.01 wt % | 2-phenylpropan-2-ol | 0.01 wt % |
| Comparative Preparation Example 1 | B(C$_6$F$_5$)$_3$ | 0.1 wt % | 2-phenylpropan-2-ol | 0.2 wt % |
| Comparative Preparation Example 2 | [Et$_3$Si][B(C$_6$F$_5$)$_4$] | 0.01 wt % | — | — |

Preparation of Isobutene Oligomer Using Catalyst and Analysis

Example 1

To an Andrew glass flask well-dried in a convection oven, a magnetic bar was put, and vacuum was applied and kept for about 1 hour. An ice bath of −20° C. was manufactured using acetone-dry ice, and the Andrew glass flask was put therein to cool. 20 g of isobutene was injected, and purified toluene was added as a solvent using a syringe.

The catalyst prepared in Preparation Example 1 was diluted in toluene and taken in a syringe and prepared. The catalyst thus prepared was added to the Andrew glass flask, the flask was transported to a bath set to 30° C., and polymerization was performed. The reaction time was 45 minutes, and after finishing the reaction, the Andrew glass flask was opened, remaining isobutene was removed, and the reaction was quenched with methanol. Remaining solvent was removed through a rotary evaporator, and remaining polymer was completely dried in vacuum until no weight change was observed.

Examples 2 to 9, and Comparative Examples 1 to 6

Isobutene oilgomers were prepared by the same method as in Example 1 except for changing the catalyst, the polymerization temperature and the type of the solvent as in Table 1 below.

Comparative Example 7

An isobutene oligomer was prepared by using [Et$_3$Si][B(C$_6$F$_5$)$_4$] and 2-phenylpropan-2-ol in the same amounts as in Preparation Example 2, omitting the step of mixing and stirring thereof to prepare a composite, and injecting to an isobutene monomer separately.

TABLE 2

| Division | Catalyst | Temperature (° C.) | Solvent |
|---|---|---|---|
| Example 1 | Preparation Example 1 | 30 | Toluene |
| Example 2 | Preparation Example 1 | 30 | Dichloromethane + toluene (1:1 v/v) |
| Example 3 | Preparation Example 1 | 30 | Dichloromethane |
| Example 4 | Preparation Example 2 | 30 | Toluene |
| Example 5 | Preparation Example 2 | 30 | Dichloromethane + toluene (1:1 v/v) |
| Example 6 | Preparation Example 3 | 30 | Toluene |
| Example 7 | Preparation Example 3 | 30 | Dichloromethane + toluene (1:1 v/v) |
| Example 8 | Preparation Example 4 | 30 | Toluene |
| Example 9 | Preparation Example 4 | 30 | Dichloromethane + toluene (1:1 v/v) |
| Comparative Example 1 | Comparative Preparation Example 1 | 30 | Dichloromethane + toluene (1:1 v/v) |
| Comparative Example 2 | Comparative Preparation Example 1 | 30 | Dichloromethane |
| Comparative Example 3 | Comparative Preparation Example 1 | 30 | Toluene |
| Comparative Example 4 | Comparative Preparation Example 1 | 30 | Toluene |
| Comparative Example 5 | Comparative Preparation Example 2 | 30 | Toluene |
| Comparative Example 6 | Comparative Preparation Example 2 | 30 | Dichloromethane |
| Comparative Example 7 | [Et$_3$Si][B(C$_6$F$_5$)$_4$], 2-phenylpropan-2-ol | 30 | Toluene |

Experimental Example 1

With respect to the isobutene oligomers of the Examples and the Comparative Examples, conversion ratio, exo-content, number average molecular weight and molecular weight distribution values were measured by the methods below and summarized in Table 3.

(1) Conversion Ratio (%)

The weight of a dried isobutene oligomer was measured and the conversion ratio was calculated.

(2) Exo-content $^1$H NMR was measured using 500 MHz NMR (Varian Co.). The presence of an exo-functional group, an endo-functional group, a tri-functional group, a tetra-functional group, a PIB-coupled-functional group, of which double bonds are present at different positions according to the positions of peaks was confirmed, and the exo-content (%) was calculated according to the following equation:

exo-content(%)=(mole number of exo-functional group/mole number of exo-functional group+ mole number of endo-functional group+mole number of tri-functional group+mole number of tetra-functional group+mole number of PIB-coupled-functional group)×100

(3) Weight Average Molecular Weight (Mw), Number Average Molecular Weight (Mn) and Peak Average Molecular Weight (Mp)

Measurement was conducted under gel permeation chromatography (GPC) analysis conditions below.
Column: PL MiniMixed B×2
Solvent: THF
Flow rate: 0.3 ml/min
Specimen concentration: 2.0 mg/ml
Injection amount: 10 µl
Column temperature: 40° C.
Detector: Agilent RI detector
Standard: polystyrene (corrected by a cubic function)
Data processing: ChemStation
(4) Molecular Weight Distribution (MWD)
Calculation was performed by weight average molecular weight (Mw)/number average molecular weight (Mn).

TABLE 3

| Division | Conversion ratio (%) | Exo-content | Mn | Mw | Mp | MWD |
|---|---|---|---|---|---|---|
| Example 1 | 98 | 86 | 1190 | 2320 | 2030 | 1.90 |
| Example 2 | 95 | 88 | 1730 | 3930 | 3700 | 2.30 |
| Example 3 | >99 | 83 | 1117 | 3602 | 2692 | 3.20 |
| Example 4 | 98 | 84 | 1194 | 2318 | 2026 | 1.90 |
| Example 5 | 92 | 84 | 1394 | 4095 | 3463 | 2.90 |
| Example 6 | 83 | 85 | 1660 | 3720 | 3550 | 2.20 |
| Example 7 | 92 | 92 | 1860 | 4230 | 4070 | 2.30 |
| Example 8 | 85 | 82 | 1220 | 2380 | 1900 | 1.95 |
| Example 9 | 88 | 84 | 1426 | 4203 | 3504 | 2.90 |
| Comparative Example 1 | — | — | — | — | — | — |
| Comparative Example 2 | — | — | — | — | — | — |
| Comparative Example 3 | — | — | — | — | — | — |
| Comparative Example 4 | — | — | — | — | — | — |
| Comparative Example 5 | 2.2 | 80 | 1648 | 4866 | 3421 | 2.95 |
| Comparative Example 6 | 8.6 | 93 | 5759 | 14662 | 10725 | 2.55 |
| Comparative Example 7 | 0.2 | 91 | 1569 | 4325 | 2944 | 2.76 |

As shown in Table 3 above, it was confirmed that isobutene oligomers having high exo-content could be prepared in various reaction conditions using Preparation Examples 1 to 4 which are the organic borate-based catalysts of the present invention. In addition, a halogenated hydrocarbon solvent such as DCM and a nonpolar hydrocarbon solvent such as toluene may be used as the reaction solvent, and a mixture thereof may also be used.

When comparing the Examples making experiments by changing the mixing ratio of the solvents, when comparing Examples 1 to 3 using the same catalyst of Preparation Example 1, Examples 4 and 5 using the same catalyst of Preparation Example 2, Examples 6 and 7 using the catalyst of Preparation Example 3, and Examples 8 and 9 using the catalyst of Preparation Example 4, it could be found that with the increase of the toluene content of the solvent, the exo-content of the oligomer increased, and an isobutene oligomer having narrow molecular weight distribution could be prepared.

That is, by using the organic borate-based catalyst of the present invention and suitably controlling the mixing ratio of the halogenated hydrocarbon solvent and the nonpolar hydrocarbon solvent, stirring time, etc., it could be confirmed that an isobutene oligomer satisfying the exo-content and the conversion ratio at the same time could be efficiently prepared.

Meanwhile, in Comparative Examples 1 to 4 using not the compound represented by Formula 1 but a catalyst prepared by mixing $B(C_6F_5)_3$ and 2-phenylpropan-2-ol, though performing cationic polymerization reaction using a greater amount by 10 times the catalyst of the Example under the same conditions, the activity as the catalyst of cationic polymerization reaction was not shown in all conditions, and an isobutene oligomer was not prepared. This shows that $B(C_6F_5)_3$ and 2-phenylpropan-2-ol could not form a stable composite, differently from the organic borate-based catalyst of the present invention, and catalyst activity could not properly be shown.

In addition, in case of Comparative Examples 5 and 6 using only the compound represented by Formula 1 and excluding the hydroxyl group-containing compound, it was confirmed that the conversion ratio was markedly reduced.

In addition, in Comparative Example 7, the silicon atom of $[Et_3Si][B(C_6F_5)_4]$ and the oxygen atom of 2-phenylpropan-2-ol did not form a covalent bond but used as separately independent materials in the polymerization of an isobutene monomer, and in this case, it could be found that polymerization reaction was rarely performed.

Analysis of Catalyst Stability

Example 1-1

In order to confirm the stability of the catalyst according to the present invention with the passage of time, comparison with the results of Example 1 using the organic borate-based catalyst immediately after preparation was made. Particularly, isobutene oligomers were prepared in the same conditions as in Example 1 except for using organic borate-based catalysts after 15 hours from preparation.

Examples 2-1, 6-1 and 7-1, and Comparative Example 3-1

Isobutene oligomers were prepared in the same conditions as in Examples 2, 6, and 7 and Comparative Example 3, respectively, except for using an organic borate-based catalyst after 15 hours from preparation.

TABLE 4

| Division | Catalyst | Catalyst using (polymerization) point | Temperature (° C.) | Solvent |
|---|---|---|---|---|
| Example 1 | Preparation Example 1 | Immediately after preparation | 30 | Toluene |

TABLE 4-continued

| Division | Catalyst | Catalyst using (polymerization) point | Temperature (° C.) | Solvent |
|---|---|---|---|---|
| Example 1-1 | Preparation Example 1 | After 15 hours | 30 | Toluene |
| Example 2 | Preparation Example 1 | Immediately after preparation | 30 | Dichloromethane + toluene (1:1 v/v) |
| Example 2-1 | Preparation Example 1 | After 15 hours | 30 | Dichloromethane + toluene (1:1 v/v) |
| Example 6 | Preparation Example 3 | Immediately after preparation | 30 | Toluene |
| Example 6-1 | Preparation Example 3 | After 15 hours | 30 | Toluene |
| Example 7 | Preparation Example 3 | Immediately after preparation | 30 | Dichloromethane + toluene (1:1 v/v) |
| Example 7-1 | Preparation Example 3 | After 15 hours | 30 | Dichloromethane + toluene (1:1 v/v) |
| Comparative Example 3 | Comparative Preparation Example 1 | Immediately after preparation | 30 | Toluene |
| Comparative Example 3-1 | Comparative Preparation Example 1 | After 15 hours | 30 | Toluene |

Experimental Example 2

With respect to the Examples and Comparative Examples, the exo-content, number average molecular weight and molecular weight distribution values were measured by the same methods in Experimental Example 1 and summarized in Table 5.

TABLE 5

| Division | Conversion ratio (%) | Exo-content | Mn | Mw | Mp | PDI |
|---|---|---|---|---|---|---|
| Example 1 | 98 | 86 | 1190 | 2320 | 2030 | 1.9 |
| Example 1-1 | 95 | 89 | 1230 | 2290 | 2180 | 1.9 |
| Example 2 | 95 | 88 | 1730 | 3930 | 3700 | 2.3 |
| Example 2-1 | 96 | 84 | 1640 | 3660 | 3550 | 2.3 |
| Example 6 | 83 | 85 | 1660 | 3720 | 3550 | 2.2 |
| Example 6-1 | 81 | 87 | 1720 | 3690 | 3580 | 2.2 |
| Example 7 | 92 | 92 | 1860 | 4230 | 4070 | 2.3 |
| Example 7-1 | 89 | 87 | 1910 | 4660 | 4460 | 2.4 |
| Comparative Example 3 | — | — | — | — | — | — |
| Comparative Example 3-1 | — | — | — | — | — | — |

As the results above, in the Examples using the organic borate-based catalyst of the present invention, it was confirmed that similar degrees of conversion ratios were shown though using the catalyst after 15 hours from the preparation as a case of using immediately after preparation, and isobutene oligomers having similar physical properties were prepared. That is, the catalyst of the present invention has excellent stability, and no quality degradation was generated though the catalyst was used after storing or distributing for a certain time.

Experimental Example 3

From the $^1$H NMR measurement results using 500 MHz NMR (Varian Co.) in Experimental Example 1, the tri+endo-content, tetra-content, and PIB-coupled-content of the isobutene oligomers of Examples 1 to 9 were calculated.

tri+endo-content(%)=(mole number of tri-functional group+mole number of endo-functional group)/ (mole number of exo-functional group+mole number of endo-functional group+mole number of tri-functional group+mole number of tetra-functional group+mole number of PIB-coupled-functional group)×100 tetra-content(%)=(mole number of tetra-functional group)/(mole number of exo-functional group+ mole number of endo-functional group+mole number of tri-functional group+mole number of tetra-functional group+mole number of PIB-coupled-functional group)×100

PIB-coupled-content(%)=(mole number of PIB-coupled-functional group)/(mole number of exo-functional group+mole number of endo-functional group+mole number of tri-functional group+mole number of tetra-functional group+ mole number of PIB-coupled-functional group)×100

In order to confirm the inclusion or not of such functional groups in commercially available materials, HRPB 1300 of Daelim Industrial Co., Ltd. was purchased as Comparative Example 8, and HRPB 2300 of Daelim Industrial Co., Ltd. was purchased as Comparative Example 9, and $^1$H NMR was measured and calculation was performed in the same way.

In addition, the $^1$H NMR spectrum of Example 8 is shown in FIG. 1, and the $^1$H NMR spectrum of Comparative Example 8 is shown in FIG. 2.

TABLE 6

| | exo-content | tri + endo-content | tetra-content | PIB-coupled-content | PIB-Cl-content |
|---|---|---|---|---|---|
| Example 1 | 86 | 8 | 4 | 2 | — |
| Example 2 | 88 | 7 | 4 | 1 | — |
| Example 3 | 83 | 10 | 5 | 2 | — |
| Example 4 | 84 | 9 | 5 | 2 | — |
| Example 5 | 84 | 9 | 6 | 1 | — |
| Example 6 | 85 | 8 | 4 | 3 | — |
| Example 7 | 92 | 4 | 3 | <1 | — |
| Example 8 | 82 | 6 | 6 | 6 | — |
| Example 9 | 84 | 8 | 6 | 2 | — |
| Comparative Example 8 | 85 | 15 | — | — | — |
| Comparative Example 9 | 85 | 15 | — | — | — |

In the isobutene oligomer of Example 8 according to the present invention, various peaks were detected in addition to an exo-functional group and an endo-functional group as shown in FIG. 1.

Particularly, as shown in FIG. 1, the presence of a tri-functional group was confirmed through the presence of additional peaks in addition to the peaks showing the endo-functional group around 5.20 ppm, and the presence of the tetra-functional group was confirmed by the peaks around 2.90 ppm. Further, the presence of the PIB-coupled-functional group was confirmed through the presence of peaks between 4.80 ppm and 4.90 ppm in addition to the peaks around 4.90 ppm, 4.70 ppm, showing the presence of the exo-functional group.

On the contrary, as shown in FIG. 2, in case of the isobutene oligomer which has been commonly used, only peaks around 4.90 ppm and 4.70 ppm, showing the exo-functional group and peaks around 5.20 ppm, showing the endo-functional group are clearly shown, and it could be confirmed that only the exo-functional group and endo-functional group are present in the oligomer, but different from the isobutene oligomer of the present invention, other double bonds positioned at the inner part of the oligomer including the tri-functional group, tetra-functional group, PIB-coupled-functional group, etc. are not present.

Like this, in cases of the conventional commonly used isobutene oligomers of Comparative Examples 8 and 9, only the exo-functional group and endo-functional group were confirmed. In the table above, the tri-functional group and the endo contents are added and shown as 15%, but this is because the peaks of the tri-functional group and endo-functional group are very close in the NMR spectrum. In practice, in terms of FIG. 2, the tri-functional group is not present in the Comparative Example. That is, an isobutene oligomer has the exo-content of 85% and the endo content of 15%.

On the contrary, in the isobutene oligomers of the Examples according to the present invention, the exo-content is shown high to the similar degree as in the Comparative Examples, and all the tri-functional group, tetra-functional group and PIB-coupled-functional group are present, and thus, the content of each functional group was calculated as in the table.

That is, in case of the Comparative Examples, the exo-content is similar to that of the oligomer of the present invention, but the remainder is all composed of the endo-functional group, and double bonds by diverse isomerization reaction were not included. On the contrary, the isobutene oligomers of the present invention include diverse oligomer inner double bonds (tri-functional group, tetra-functional group, PIB-coupled-functional group) without reduced exo-content, and are all novel isobutene oligomers having different structure, shape and physical properties from the Comparative Examples.

Experimental Example 4

With respect to the isobutene oligomers prepared in Example 8 and Comparative Example 8, viscosity was measured, and the values are shown in Table 7 below.

(1) Viscosity (cst)

Measurement was performed by a ASTM D445 dynamic viscosity measurement method at 100° C.

TABLE 7

|  | Viscosity |
| --- | --- |
| Example 8 | 440 |
| Comparative Example 8 | 460 |

As shown in Table 7 above, the isobutene oligomer of the present invention showed higher number average molecular weight and lower viscosity when compared with the Comparative Example, and it could be found to have improved processability and to be easily applied in various uses.

Experimental Example 5

After polymerizing an isobutene oligomer according to Example 1, a polymerized solution was passed as it was through a column charged with celite to remove a catalyst.

Then, with respect to a case of removing the catalyst through the celite filter, a case of removing the catalyst through dissolving in an organic solvent and washing by a conventional method, and a case of not removing the catalyst, ICP and IC analyses were performed, respectively, by the method below, and the results are shown in Table 8 below.

(1) F, Cl Analysis

Measurement was performed using Combustion IC (ICS-2100/AQF-5000, Thermo Scientific Dionex) under the conditions below.

Column: IonPac AS18 analytical (4×250 mm), IonPac AG18 guard (4×50 mm)

Eluent type: KOH (30.5 mM)

Eluent flow rate: 1 mL/min

Detector: Suppressed Conductivity Detector

SRS Current: 76 mA

Injection Volume: 20 μl

Isocratic/Gradient conditions: Isocratic

TABLE 8

| Specimen name | Anion component [mg/kg] | |
| --- | --- | --- |
|  | F | Cl |
| PB in a case of removing catalyst through filter | <10 | <10 |
| PB in a case of removing catalyst through washing | <10 | <10 |
| PB in a case of not removing catalyst | 40 | 45 |

As shown from the results above, it could be found that remaining catalyst may be effectively removed through a simple method of preparing an isobutene oligomer using the organic borate-based catalyst of the present invention and passing through a filter without a separate washing process.

The invention claimed is:

1. An organic borate-based catalyst comprising a compound represented by Formula 1 and a hydroxyl group-containing compound, wherein a silicon atom (Si) of the compound represented by Formula 1 and an oxygen atom (O) of the hydroxyl group-containing compound form a covalent bond:

[Formula 1]

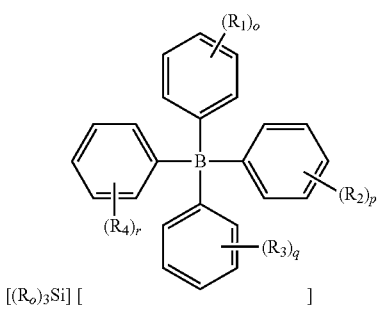

[(R$_o$)$_3$Si] [ ]

in Formula 1,
each R$_0$ is independently hydrogen, an alkyl group of 1 to 20 carbon atoms, an alkoxy group of 1 to 20 carbon atoms, an aryl group of 6 to 20 carbon atoms or an aryloxy group of 6 to 20 carbon atoms,
R$_1$ to R$_4$ are each independently hydrogen, a halogen group or an alkyl group of 1 to 20 carbon atoms, and
o, p, q and r are each independently an integer of 1 to 5,
wherein the hydroxyl group-containing compound is a compound represented by Formula 2:

[Formula 2]

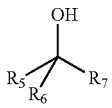

in Formula 2,
R$_5$ to R$_7$ are each independently hydrogen, a hydroxyl group, a hydroxyalkyl group of 1 to 20 carbon atoms, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkoxy group of 1 to 20 carbon atoms, an aryloxy group of 6 to 20 carbon atoms, an alkylaryl group of 7 to 20 carbon atoms or an arylalkyl group of 7 to 20 carbon atoms, provided that at least two of R$_5$ to R$_7$ are not hydrogen, and one of R$_5$ to R$_7$ is an aryl group of 6 to 20 carbon atoms, a heteroaryl group of 5 to 20 carbon atoms, or an aryloxy group of 6 to 20 carbon atoms.

2. The organic borate-based catalyst according to claim 1, wherein each R$_0$ is independently hydrogen, an alkyl group of 1 to 12 carbon atoms, an alkoxy group of 1 to 12 carbon atoms, an aryl group of 6 to 12 carbon atoms or an aryloxy group of 6 to 12 carbon atoms, and R$_1$ to R$_4$ are each independently hydrogen, a halogen group or a halogen group-substituted alkyl group of 1 to 12 carbon atoms.

3. The organic borate-based catalyst according to claim 1, wherein R$_5$ to R$_7$ are each independently hydrogen, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkylaryl group of 7 to 20 carbon atoms or an arylalkyl group of 7 to 20 carbon atoms, provided that at least two of R$_5$ to R$_7$ are not hydrogen, and one of R$_5$ to R$_7$ is selected from the group consisting of an aryl group of 6 to 20 carbon atoms and a heteroaryl group of 5 to 20 carbon atoms.

4. The organic borate-based catalyst according to claim 1, wherein the organic borate-based catalyst is a compound represented by Formula 3:

[Formula 3]

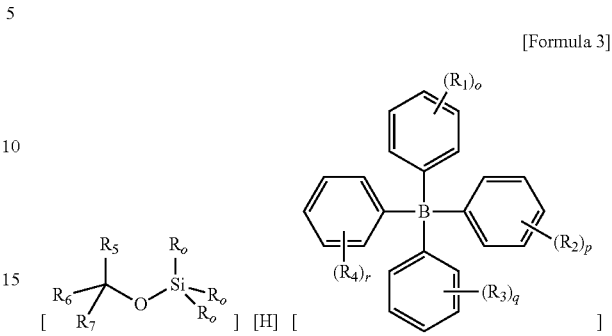

[H] [ ]

in Formula 3,
each R$_0$ is independently hydrogen, an alkyl group of 1 to 20 carbon atoms, an alkoxy group of 1 to 20 carbon atoms, an aryl group of 6 to 20 carbon atoms or an aryloxy group of 6 to 20 carbon atoms,
R$_1$ to R$_4$ are each independently hydrogen, a halogen group or an alkyl group of 1 to 20 carbon atoms,
o, p, q and r are each independently an integer of 1 to 5, and
R$_5$ to R$_7$ are each independently hydrogen, a hydroxyl group, a hydroxyalkyl group of 1 to 20 carbon atoms, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkoxy group of 1 to 20 carbon atoms, an aryloxy group of 6 to 20 carbon atoms, an alkylaryl group of 7 to 20 carbon atoms or an arylalkyl group of 7 to 20 carbon atoms, provided that at least two of R$_5$ to R$_7$ are not hydrogen, and at least one of R$_5$ to R$_7$ is an aryl group of 6 to 20 carbon atoms, a heteroaryl group of 5 to 20 carbon atoms, or an aryloxy group of 6 to 20 carbon atoms.

5. The organic borate-based catalyst according to claim 1, wherein a weight ratio of the compound represented by Formula 1 and the hydroxyl group-containing compound is 1:0.5 to 1:4.

6. A method for preparing an isobutene oligomer, comprising a step of polymerizing an isobutene monomer in the presence of the organic borate-based catalyst according to claim 1.

7. The method for preparing an isobutene oligomer according to claim 6, wherein the polymerization is performed in the presence of a halogen-free solvent.

8. The method for preparing an isobutene oligomer according to claim 7, wherein the halogen-free solvent is one or more selected from the group consisting of butane, pentane, neopentane, hexane, cyclohexane, methylcyclohexane, heptane, octane, benzene, toluene, xylene and ethylbenzene.

9. The method for preparing an isobutene oligomer according to claim 6, wherein the polymerization is performed at a temperature of 10 to 30° C.

10. A method for preparing an-the organic borate-based catalyst of claim 1, the method comprising a step of injecting a compound represented by Formula 1 and a hydroxyl group-containing compound to a hydrocarbon solvent, and stirring:

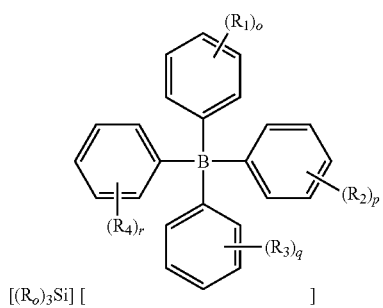

[Formula 1]

in Formula 1, each $R_0$ is independently hydrogen, an alkyl group of 1 to 20 carbon atoms, an alkoxy group of 1 to 20 carbon atoms, an aryl group of 6 to 20 carbon atoms or an aryloxy group of 6 to 20 carbon atoms, $R_1$ to $R_4$ are each independently hydrogen, a halogen group or an alkyl group of 1 to 20 carbon atoms, and o, p, q and r are each independently an integer of 1 to 5, wherein the hydroxyl group-containing compound is a compound represented by Formula 2:

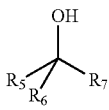

[Formula 2]

in Formula 2, $R_5$ to $R_7$ are each independently hydrogen, a hydroxyl group, a hydroxyalkyl group of 1 to 20 carbon atoms, an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroaryl group of 5 to 20 carbon atoms, an alkoxy group of 1 to 20 carbon atoms, an aryloxy group of 6 to 20 carbon atoms, an alkylaryl group of 7 to 20 carbon atoms or an arylalkyl group of 7 to 20 carbon atoms, provided that at least two of $R_5$ to $R_7$ are not hydrogen, and one of $R_5$ to $R_7$ is an aryl group of 6 to 20 carbon atoms, a heteroaryl group of 5 to 20 carbon atoms, or an aryloxy group of 6 to 20 carbon atoms, wherein a silicon atom (Si) of the compound represented by Formula 1 and an oxygen atom (O) of the hydroxyl group-containing compound form a covalent bond.

11. The method for preparing an organic borate-based catalyst according to claim 10, wherein the stirring is performed for 0.5 to 20 hours.

* * * * *